(12) United States Patent
Butler

(10) Patent No.: US 11,770,385 B2
(45) Date of Patent: Sep. 26, 2023

(54) SYSTEMS AND METHODS FOR MALICIOUS CLIENT DETECTION THROUGH PROPERTY ANALYSIS

(71) Applicant: PAYPAL, INC., San Jose, CA (US)

(72) Inventor: Blake Morgan Butler, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 268 days.

(21) Appl. No.: 16/731,501

(22) Filed: Dec. 31, 2019

(65) Prior Publication Data

US 2021/0203668 A1 Jul. 1, 2021

(51) Int. Cl.
*H04L 9/40* (2022.01)

(52) U.S. Cl.
CPC .......... *H04L 63/123* (2013.01); *H04L 63/145* (2013.01); *H04L 63/1416* (2013.01)

(58) Field of Classification Search
CPC . H04L 63/1416; H04L 63/145; G06F 21/577; G06F 21/554
See application file for complete search history.

(56) References Cited

U.S. PATENT DOCUMENTS

| | | | | |
|---|---|---|---|---|
| 8,244,799 B1 * | 8/2012 | Salusky | ............ | G06F 16/24575 709/203 |
| 9,106,693 B2 * | 8/2015 | Quinlan | ............. | H04L 63/1441 |
| 9,660,974 B2 * | 5/2017 | Grajek | ................... | H04L 67/125 |
| 9,953,009 B1 * | 4/2018 | Behar | ................... | G06F 40/186 |
| 10,333,973 B1 * | 6/2019 | Hewitt | ................ | H04L 63/145 |
| 10,764,611 B2 * | 9/2020 | Stefanidis | ............ | H04N 21/232 |
| 2003/0235303 A1 * | 12/2003 | Evans | ..................... | G06F 21/84 380/216 |
| 2010/0011243 A1 * | 1/2010 | Locasto | ............. | G06F 11/1438 714/E11.132 |
| 2010/0162393 A1 * | 6/2010 | Sobel | ...................... | H04L 67/02 726/23 |
| 2011/0202905 A1 * | 8/2011 | Mahajan | ............... | G06F 16/951 717/140 |
| 2013/0144714 A1 * | 6/2013 | Yuan | .................. | G06Q 30/0248 705/14.47 |
| 2015/0067866 A1 * | 3/2015 | Ibatullin | ............. | H04L 63/0209 726/25 |
| 2016/0098563 A1 * | 4/2016 | Sharma | ..................... | G06F 8/77 726/25 |
| 2016/0330132 A1 * | 11/2016 | Rickey | ................... | G06Q 10/06 |
| 2017/0244737 A1 * | 8/2017 | Kuperman | ............... | G06N 3/04 |
| 2018/0329801 A1 * | 11/2018 | Mckee | ................ | G06F 11/3624 |
| 2020/0242251 A1 * | 7/2020 | Wisgo | ................. | H04L 63/1433 |

* cited by examiner

*Primary Examiner* — Ali S Abyaneh
(74) *Attorney, Agent, or Firm* — HAYNES AND BOONE, LLP

(57) ABSTRACT

Systems and methods for detecting malicious clients through inspecting application properties are described. These may include requesting application properties from a client application, receiving a digital fingerprint from the client device, determining whether the digital fingerprint indicates that the client application is likely a malicious client, and taking a mitigation action based on determining that the client application is likely a malicious client.

20 Claims, 5 Drawing Sheets

SYSTEMS AND METHODS FOR MALICIOUS CLIENT DETECTION THROUGH PROPERTY ANALYSIS

FIELD OF INVENTION

The present specification generally relates to anomalous network traffic detection and mitigation, and, more specifically, to detecting and mitigating anomalous traffic through inspection of application properties according to various embodiments of the disclosure.

BACKGROUND

Applicant recognizes that service providers that offer a platform for conducting services (such as electronic transactions) may be subjected to anomalous and potentially malicious network traffic. Many attacks on a computer network involve malicious applications posing as legitimate browsers. Criminals may collect data (e.g., application property data, etc.) from user devices of legitimate users so that they can alter the software used in an attack based on the application property data collected from the user devices. After being altered, the software may pose as legitimate browsers by returning data associated with a legitimate application when prompted by a server. Due to the ease with which a malicious application can misreport its own properties, there is a need for improved detection of malicious applications.

Figure 1:
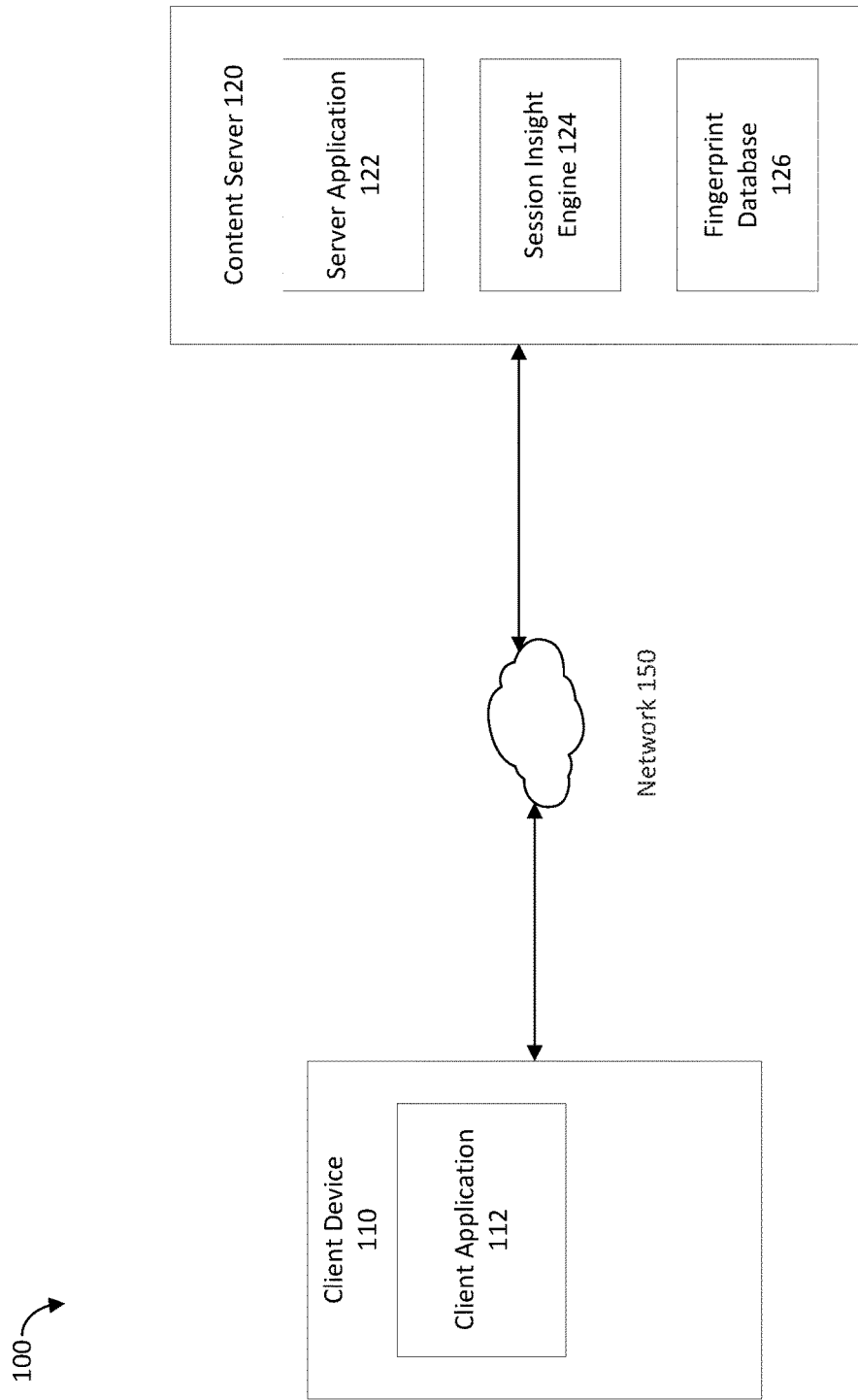
FIG. 1 is a block diagram illustrating a session insight system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for analyzing application properties to detect potentially malicious client applications in communication with a server, according to various embodiments. Any service provider connected to the internet carries risks that malicious users may attempt to interact with the service provider in malicious or fraudulent ways using malicious client applications that pose as legitimate applications. Some attacks from malicious users include the use of client applications (e.g., web browsers, etc.) which have been modified to interact with the service provider in malicious ways. By detecting whether a client application is malicious, service providers can mitigate the harm caused by the malicious client applications. A web browser running on a standard off-the-shelf smartphone may correspond to an ordinary user. Meanwhile, a customized headless web browser running on a virtual machine without any associated display screen hardware (e.g. nothing to display web pages on) is much more likely to correspond to a malicious user seeking to violate security protocols, for example.

One way of detecting malicious client applications involves analyzing values of application properties of the client applications (property values) to see if the values of the properties match property values associated with a legitimate application. However, malicious users may circumvent these detection techniques by modifying a malicious client application such that the malicious client application may return false property values that do not represent properties of the malicious client application, but instead may correspond to property values of a legitimate application (e.g., the returned property values may be artificially generated or predetermined based on data obtained from other legitimate client applications), thereby posing to the server as a legitimate client application. For example, when a client application attempts to access online resources of a server, the server may obtain one or more user-agent property values from the client application, and may use the obtained user-agent property values to determine a type of application (e.g., a name and/or a version of a web browser, etc.) associated with the client application and/or an environment (e.g., a name of the platform running the web browser, etc.) associated with the client application, which may then be used by the server to determine a likelihood that the client application is a malicious or legitimate application. However, since a malicious client application can be modified or otherwise configured to return a different user-agent property value than what is actually associated with the malicious client application (e.g., false property values), the server may incorrectly classify the malicious client application as a legitimate application based on the obtained user-agent property value.

The present disclosure describes an improved method for detection of malicious client applications based on a number (e.g., a count) and/or an order of property values returned by a client application. When a legitimate client application (e.g., a client application that has not been modified to return false property values) is requested by a server to return certain types of property values using an application programming interface (API), the legitimate client application would return property values of a particular count (e.g., a particular number of property values) and in a particular order that match a predetermined number (e.g., a predetermined count) and a predetermined order that are associated with legitimate applications.

However, when a malicious client application has been modified to return false property values (e.g., to return property values not associated with the malicious client application), the number (e.g., count) of property values and the order of the property values returned by the malicious client application would not match the predetermined number and/or the predetermined order. Thus, through inspecting the number of application property values and the order that they are returned to the server by a client application, the server may determine whether the application property values represent the actual properties of the client application or are false property values in an attempt to pose to the server as a legitimate client application.

In some embodiments, a server (e.g., a web server) may generate a model digital fingerprint based on application property values that are expected from a legitimate client application. In particular, the model digital fingerprint may be generated based, at least in part, on a number (e.g., a count) of application property values that are expected to be returned by a legitimate client in response to an application property request (e.g., an API request) and an order in which the property values are expected to be returned by the legitimate client. Upon receiving a request from a client application (e.g., a web browser) to access online resources associated with the server, the server may request (e.g., through an API call) the client application to provide certain types of property values associated with the client application.

In order for the digital fingerprint generated for the client application to match the model digital fingerprint, the property values obtained from the client application, the number of property values, and the order the property values are returned from the client application all must be associated with those of a legitimate application, according to various embodiments. When the digital fingerprint generated for the client application does not match the model digital fingerprint, in various embodiments at least one of the following conditions must exist: (1) one or more of the property values obtained from the client application do not match those associated with a legitimate client application, (2) the number of property values returned by the client application does not match the number of property values that would have been returned by a legitimate client application, or (3) the order in which the property values returned by the client application does not match the order associated with a legitimate client application.

Thus, the server may determine whether the client application is likely a legitimate application or a malicious application based on whether the digital fingerprint generated for the client application matches the model digital fingerprint. For example, the server may determine that the client application is likely a legitimate application when the digital fingerprint generated for the client application matches the model digital fingerprint and may determine that the client application is likely a malicious application when the digital fingerprint generated for the client does not match the model digital fingerprint. Based on such a determination, one or more mitigation actions may occur (e.g. prohibiting a transaction, requiring a secondary authentication, instituting one or more restrictions or limits on a device and/or user account associated with the client application, etc.)

FIG. 1 illustrates a session insight system 100 that implements the malicious client application detection process as described herein according to one embodiment of the disclosure. The system 100 includes a client device 110, which may be a computer, tablet, mobile device, or other computing device and a content server 120.

In some embodiments, the content server 120 may generate one or more model digital fingerprints based on a property value arrangement (e.g., the expected property values that would be returned by a legitimate client application, an expected number of property values expected that would be returned from a legitimate client application, an expected order of the property values that would be returned by a legitimate client application, etc.) associated with a legitimate client application. For example, the content server may generate or otherwise acquire a first model digital fingerprint associated with a Safari® web browser running on a Mac OSX® platform, a second model digital fingerprint associated with a Google Chrome® web browser running on a Windows® OS platform, a third model digital fingerprint associated with Firefox® web browser running on a Mac OSX® platform. The content server 120 may store the model digital fingerprints in the fingerprint database 126.

The content server 120 may include a server application 122 (e.g., a web server) configured to service requests (e.g., web requests, content requests, etc.) received from client devices such as the client device 110. The client device 110 may use a client application 112 (e.g. a web browser) to transmit a request for content to the content server 120 over a network 150. When the server application 122 receives the request for content from the client device 110, the content server 120 may utilize a session insight engine 124 to determine whether the client application 112 is likely to be malicious, using the techniques described herein. For example, the session insight engine 124 may request the client application 112 to provide certain types of property values associated with the client application 112, for example, via an API call. In some embodiments, when property values are returned to the session insight engine 124 (e.g., as a response to the API call), the session insight engine 124 may determine a number of property values that are returned by the client application 112 and an order in which the property values are returned by the client application 112. The session insight engine 124 may then generate a digital fingerprint for the client application 112 based on the property values returned by the client application 112 (e.g., based, at least in part, on the actual property values returned by the client application 112, the number of property values returned by the client application 112, the order in which the property values are returned by the client application 112, etc.). In some embodiments, instead of generating the digital fingerprint at the content server 120, the session insight engine 124 may cause the digital fingerprint to be generated at the client device 110 and transmitted from the client device 110 to the content server 120. For example, the session insight engine 124 may transmit programming script (e.g., JavaScript®, etc.) or other instructions to the client device 110 prior to or in response to receiving the request for content. The programming script, when executed by the client device 110 may obtain the property values and generate the digital fingerprint based on the property values at the client device 110 and transmit the generated digital fingerprint to the session insight engine 124 over the network 150.

In some embodiments, the session insight engine 124 may determine whether the client application 112 is likely a legitimate client application or a malicious client application by comparing the digital fingerprint generated for the client application 112 against one or more of the model digital fingerprints stored in the fingerprint database 126. When the session insight engine 124 determines that the client application 112 is likely a malicious application, the content server 120 may take one or more mitigation actions (e.g., deny the request by the client application 112, blacklist an Internet Protocol (IP) address associated with the client device 110, etc.) to prevent an attack by the client device 110. In some embodiments, the session insight engine 124 and the fingerprint database 126 may reside on different computing systems accessible by the content server 120. The functions of each component in the session insight system 100 are further described in FIGS. 2-4 below.

Figure 2:
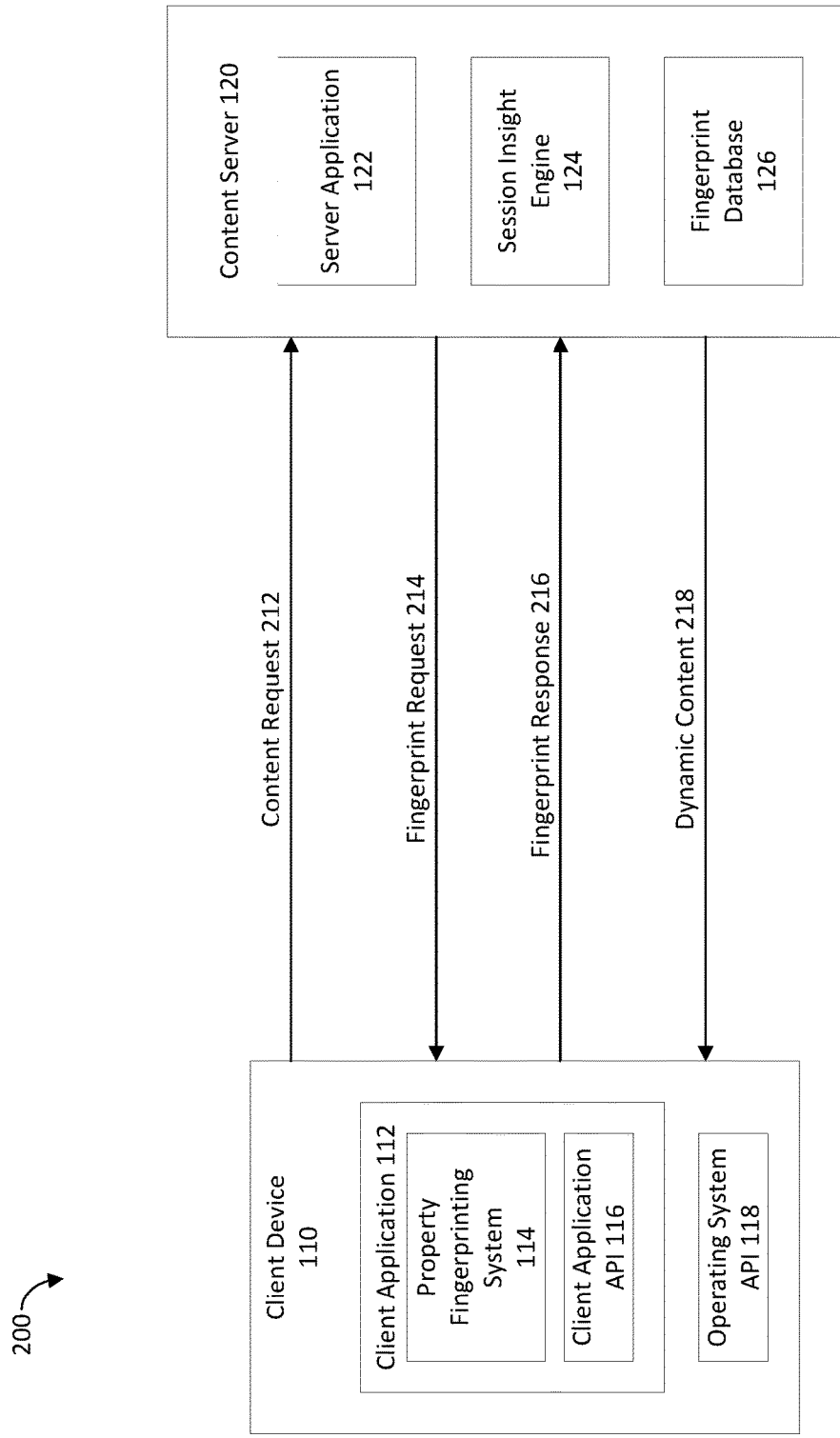
FIG. 2 is a block diagram illustrating the interaction between the client device and the content server according to an embodiment of the present disclosure.

FIG. 2 shows a block diagram 200 illustrating the interaction between the client device 110 and the content server 120 according to some embodiments of the present disclosure. The client device 110 executes the client application 112, which may be a web browser application or another application masquerading as a typical consumer web browser. The client application 112 is configured to send a content request 212 to the content server 120. In some embodiments, the content request may be an HTTP request similar to a request generated by a web browser. The content server 120 executes a server application 122. The server application 122 receives the content request 212 from the client device 110. Based on the content request 212, the server application 122 may utilize the session insight engine 124 to generate a fingerprint request 214 as part of the content sent to the client application 112. The fingerprint request 214 contains logic (e.g., implemented as programming script) that is associated with a property fingerprinting system 114, which may be executed by the client application 112 or otherwise the client device 110 to generate a digital fingerprint using techniques described herein. The property fingerprinting system 114, described further in FIG. 4, below, may cause the results to be sent to the content server 120 as a fingerprint response 216.

Alternatively, instead of causing the client device 110 to generate the digital fingerprint for the client application 12, the session insight engine may obtain property values directly from the client application 112 (e.g., from the request for content itself, through an API call, etc.), and may generate the digital fingerprint based on the property values obtained from (e.g., returned from) the client application 112. The session insight engine 124 may compare the data in the fingerprint response 216 (e.g., the fingerprint generated by the client device 110 based on property values obtained from the client application 112) or the digital fingerprint generated by the session insight engine 124 to model digital fingerprints to determine whether the client application 112 is likely to be malicious. Based on the results from comparing the fingerprint response 216 to model digital fingerprints in the fingerprint database 126, the content server 120 may perform one or more mitigation actions.

Client device 110 may be a desktop, mobile device, tablet, or other computing device configured to execute the client application 112. The client application 112 may be a web browser or other application capable of communicating with the content server 120. The client application 112 sends the content request 212 to the content server 120. The content request 212 may be an HTTP request, a request through web services, or other request sent from a client application 112 to a content server 120. The server application 122 on the content server 120 receives the content request 212 and determines the proper response. The server application 122 may use the session insight engine 124 to perform property fingerprinting. In some embodiments, the server application 122 determines whether to perform property fingerprinting based on the resource requested by the client application 112, such as only performing property fingerprinting when the client application 112 is requesting to access a particular type of resource (e.g., user account information, etc.) from the content server 120. Thus, upon receiving the content for request from the client device 110, the content server 120 (and/or the server application 122) may first determine a type of resource that is being requested in the request for content.

The content server 120 (and/or the server application 122) may then determine whether to perform the property fingerprinting based on the type of resource requested in the request for content. When it is determined that the type of resource being requested in the request for content requires property fingerprinting (e.g., request to access a funding account, request to perform a transaction using a user account, etc.), the session insight engine 124 may transmit the fingerprint request 214 to the client application 112. The fingerprint request 214 may consist of code for execution by the client application 112 to perform the property fingerprinting system 114. Fingerprint request 214 may be included along with other data, e.g., if a user clicks a button that says, "Log in to your account", the user may receive in response a login web page that also includes fingerprint request 214.

The code in fingerprint request 214 may consist of JavaScript code, or other code that can be executed by the client application 112. The client application 112 executes the property fingerprinting system 114 to produce the fingerprint response 216. The fingerprint response 216 is sent to the content server 120 and used by the session insight engine 124 to help determine a risk level as to whether the client application 112 is a malicious application as opposed to a legitimate client. The server application 122 may perform mitigation or remedial actions in response to a determination that the client application 112 is likely malicious software. The mitigation actions may include denying access to the requested resource, requesting additional authentication from the client application 112, disabling the user account associated with the user of the client application 112, retaining more detailed logs of the interaction between the client application 112 and the content server 120, blacklisting the client device 110 based on an IP address of the client device 110, and notifying administrators of the content server 120 of suspicious activity.

Figure 3:
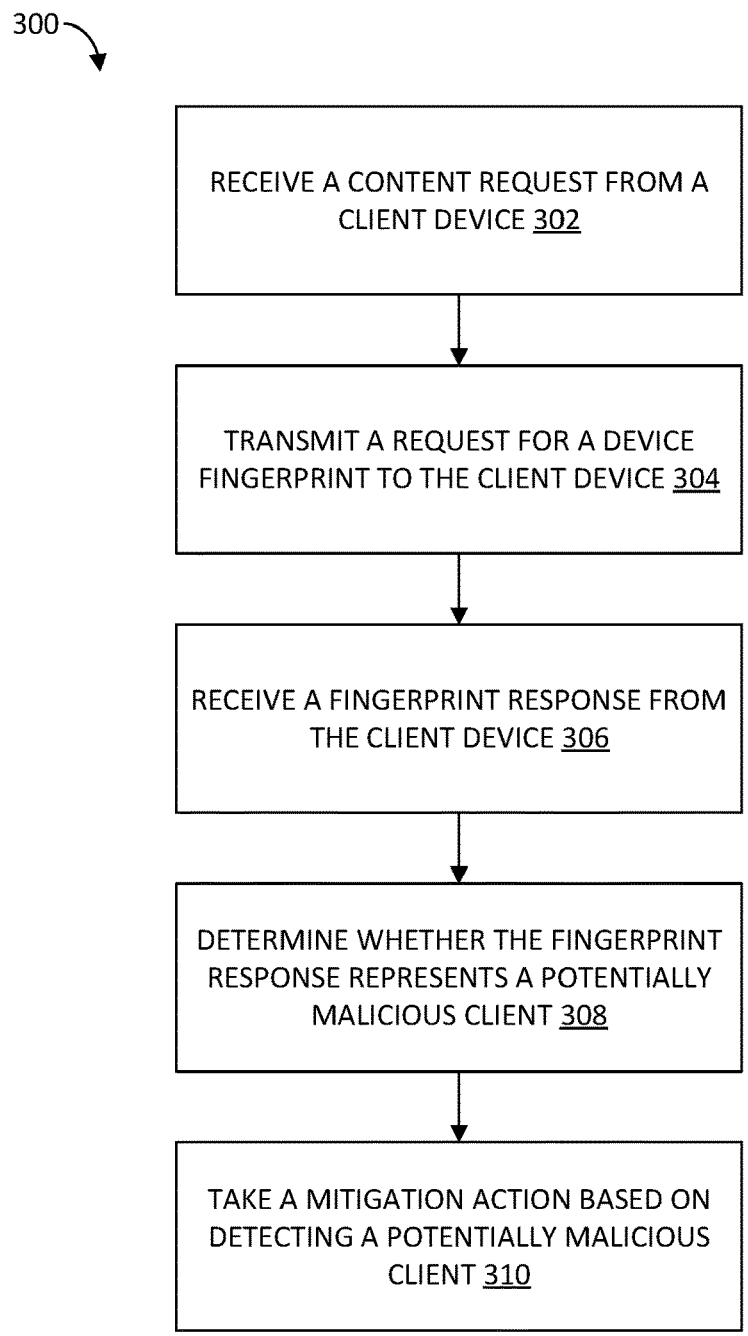
FIG. 3 is a flowchart showing a process of detecting a malicious client application based on the session insight system according to an embodiment of the present disclosure.

FIG. 3 illustrates an exemplary process 300 for determining whether a client application that requests to access an online resource of a server is likely a malicious client application, according to some embodiments of the disclosure. One or more aspects of process 300 may be performed by content server 120 or any suitable computer system executing stored computer instructions, according to various embodiments. As described in detail below, the content server 120 may receive the content request 212 from the client device 110. The content server 120 transmits the fingerprint request 214 to the client device 110 to cause the property fingerprinting system 114 to be performed on the client device 110. The property fingerprinting system 114 is described in further detail in FIG. 4 below. Once the client device 110 has created the fingerprint response 216, the response may be sent to the content server 120. Based on whether the fingerprint response 216 matches an expected value, the content server 120 may take a mitigation action.

At step 302, the content server 120 may receive the content request 212 from the client application 112 executing on the client device 110. The client application may be a web browser or other application operable to request web pages over a network. The content server 120 may use the server application 122 for providing content in response to the content request 212. However, the content server 120 may determine whether the client application 112 is possibly a malicious client application before instructing the server application to service the request. For example, the content server 120 may determine whether to perform property fingerprinting based on the content request 212. In some embodiments, the content server 120 is configured to only perform property fingerprinting when certain resources (e.g., certain content) are requested, such as the login page for a website or a request to execute a financial transaction. The content request 212 may contain properties identifying the client application 112 and/or the client device 110. In some embodiments, the server application 122 may determine that property fingerprinting should occur based on the properties identifying the client application 112 or the client device 110.

For example, the client device 110 executes the client application 112, such as a web browser. The browser may send the content request 212 in the form of an HTTP request for a web page to a content server 120. The HTTP request may contain properties such as the User-Agent in the header of the HTTP request. The content server 120 executes the server application 122 to respond to the HTTP request. The server application 122 may determine that the client application 112 is requesting a login page and that the HTTP request contains a User-Agent property identifying the client application 112 as the Chrome web browser. In response, the server application 122 may determine that property fingerprinting should occur. The server application 122 may utilize the session insight engine 124 to perform property fingerprinting using techniques described herein.

At step 304, the session insight engine 124 transmits the fingerprint request 214 to the client application 112, according to various embodiments. In some embodiments, the fingerprint request 214 may comprise code to be executed by the client application 112 to implement the property fingerprinting system 114. The code may be JavaScript or other programming language that the client application 112 is configured to execute and capable of retrieving application properties. The fingerprint request may be included in a web page transmitted to the client application, and may be transmitted via HTTP response. Upon receipt of the fingerprint request 214, the client application 112 will execute the property fingerprinting system 114, as described in FIG. 4 below to create a property fingerprint of the client application 112, according to various embodiments.

Continuing the example, the session insight engine 124 may transmit JavaScript code to implement the property fingerprinting system 114 to the browser. The browser (e.g., the client application 112) may receive the JavaScript code and execute the property fingerprinting system 114. The property fingerprinting system 114 may contain logic to retrieve one or more application properties from the client application 112. The JavaScript code may contain code that, when executed, causes the client application 112 to use the JavaScript API to iterate over a browser object and retrieve one or more property values. When the client application 112 is a legitimate client application, the client application 112 would provide property values that represent the corresponding properties associated with the client application 112. On the other hand, when the client application 112 is a malicious client application, the client application 112 may have been altered to return false property values not associated with the client application 112 (e.g. false values giving the impression that the client application 112 is some other type of program and/or is running on a different type of computing device than it actually is).

In some embodiments, based on the obtained property values, the fingerprinting system 114 may determine a number of property values within the obtained property values and an order in which the property values are returned by the client application 112. The retrieved property values and their characteristics (e.g., the number of values and the order in which they are returned, etc.) are then used by the property fingerprinting system 114 to generate a digital fingerprint. As discussed herein, in some embodiments, instead of using the fingerprinting system 114 to generate the digital fingerprint at the client device 110, the session insight engine 124 may obtain the property values directly from the client application 112 and generate the digital fingerprint for the client application at the content server 120.

At step 306, the client device 110 may generate the fingerprint response 216 based on the digital fingerprint generated for the client application 112. The property fingerprinting system 114 will create the fingerprint response 216 based on the application properties retrieved from the client application 112. The fingerprint response 216 is then sent to the session insight engine 124. The fingerprint response 216 comprises information that communicates the property names and order that one or more properties were retrieved by the property fingerprinting system 114. The one or more properties may be a subset of all properties retrieved by the property fingerprinting system 114. In some embodiments, the fingerprint response 216 may be a list or array of property names in an order based on the order they were retrieved by the property fingerprinting system 114. In other embodiments, the fingerprint response 216 may be a single value representing the number of values and the order of retrieved property values. The single value may comprise a concatenation of the retrieved property names (or values) or a token that identifies a particular ordering of retrieved property names, such as a hash of the concatenation. The fingerprint response 216 is then transmitted by the client application 112 to the content server 120.

Continuing the example above, the property fingerprinting system 114 may generate the fingerprint response 216 by taking a subset of the browser properties retrieved from the browser. The property names may be concatenated in the order they were retrieved, and the property fingerprinting system 114 may use the JavaScript API to apply a hashing algorithm to the concatenated list of property names to generate a hash to send to the content server 120 as the fingerprint response 216. Alternatively, the concatenated list of property names can be sent back to the content server 120 in plain text, or the property names may be sent back as an ordered array of individual properties.

At step 308, the fingerprint response 216 is compared to expected values (e.g., model digital fingerprints) for a legitimate client application. The expected values may be stored in the fingerprint database 126 on the content server 120. Each entry in the fingerprint database 126 may comprise an application name, version number, and a model digital fingerprint that represents the property values and their characteristics associated with a legitimate client application corresponding to the application name and version number. The model digital fingerprint may include and/or indicate information such as property names, the order that the property values are returned when queried from a legitimate client application, or a concatenation, hash, or other representation of a property fingerprint. If the fingerprint response 216 does not match an expected value in the fingerprint database, then the session insight engine 124 may determine that the client application is likely to be malicious, as the client application 122 may have been altered to return false property values not associated with the client application 112. In an alternative embodiment, the fingerprint database 126 may additionally contain the property fingerprints of known malicious client applications 112. If the fingerprint response 216 matches one of the property fingerprints of known malicious client applications, the session insight engine 124 may determine that the client application 112 is malicious and the content server 120 may take a mitigation action based on the determination by the session insight engine 124.

In some embodiments, the model digital fingerprints for legitimate client applications can be determined by having Continuing the example above, the session insight engine 124 may receive the fingerprint response 216 comprising an MD5 hash representing the property names requested by the fingerprint request 214 in the order they were retrieved from the browser. The session insight engine may compare the fingerprint response 216 to values in the fingerprint database 126. The entry in the fingerprint database may be an MD5 hash of a particular order of property names associated with a legitimate client application (e.g., "userAgent, appName, appVersion, and platform vendor", which may or may not match the MD5 hash of the fingerprint response 216 (e.g., would not match when property values were returned by the browser to the property fingerprinting system 114 in a different order than expected from a legitimate client application). When the fingerprint response 216 is determined not to match an expected value in the fingerprint database 126, the session insight engine 124 may determine that the client application 112 is likely malicious. The content server 120 may take a mitigation action based on the determination by the session insight engine 124.

At step 310, the content server 120 may take a mitigation action based on a determination by the session insight engine 124 that the client application 112 is likely to be malicious. The mitigation action may include dynamic content 218 based whether the session insight engine 124 determines that the client application 112 is likely to be malicious. In some embodiments, the content server 120 may deny the client application 112 access to the requested content. Denying access may comprise refusing to allow the user to login or presenting dynamic content 218 by redirecting them to a web page indicating access to the resource is denied. In some embodiments, the content server 120 may use dynamic content to request additional authentication from the client application. The additional authentication may comprise one or more of requesting user input to indicate a human user, such as a CAPCHA challenge-response test, requesting answers to security questions, or requesting the input of a two-factor authentication code, such as a code sent by text message to a user's mobile device. In other embodiments, the content server 120 may disable the user account. The client application 112 may be informed by the server application 122 using dynamic content to display information to the use that the user account is disabled and provide a legitimate user with information needed to re-enable the account. In some embodiments, the content server 120 may modify the level of detail retained in log files so that more detailed information is retained when the client application 112 is likely to be malicious. The more detailed logging may be applied to interactions between the client application 112 and the content server 120 and may include the content of each message transmitted between the client application 112 and the content server 120. In some embodiments, the content server 120 may notify administrators of the content server 120 of interactions between the client application 112 and the content server 120 when the client application 112 is likely to be malicious. The notifications may occur via e-mail, text message, or other means of communication available to the content server, and the notifications may occur in real-time while the client application 112 is interacting with the content server 120 or the notifications may be aggregated into a report showing trends in potentially malicious activity.

Continuing the above example, in response to the session insight engine 124 determining that the hash in the fingerprint response 216 does not match an expected value in the fingerprint database 126 of the content server 120, the content server 120 may perform a mitigation action. The content server 120 may deny access to the web page in the HTTP request and present dynamic content 218 to redirect the user to a page explaining that access has been denied due to suspicious activity associated with the user. The content server 120 may also disabled the user's account. Alternatively, the content server 120 may instead user dynamic content 218 to require the user to use two-factor authentication and provide user input in the form of a code that is sent via text message to the user's mobile device. In some cases, the content server 120 may log additional information related to the browser's connection with the content server and notify the server administrators that the browser may be malicious software where the browser properties have been modified to allow the browser to pose as a legitimate user.

Figure 4:
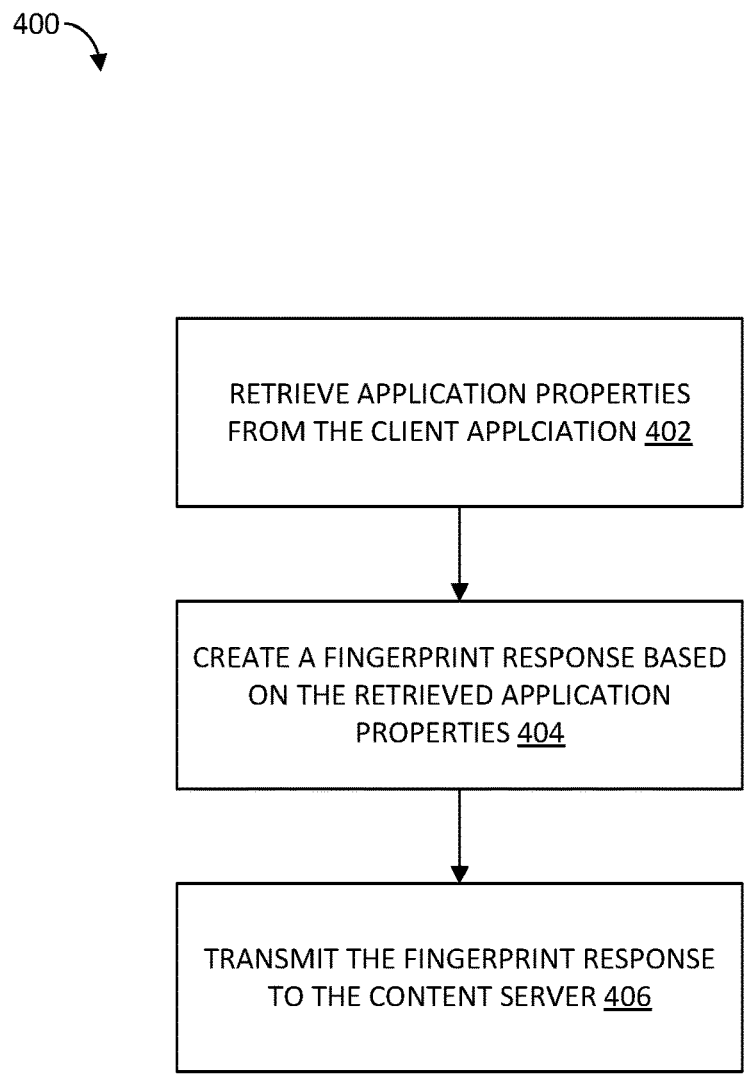
FIG. 4 is a flowchart showing a process for property fingerprinting according to an embodiment of the present disclosure.

FIG. 4 illustrates an exemplary process 400 for the property fingerprinting system 114 according to some embodiments of the disclosure. The content server 120 may send the fingerprint request 214 to the client application 112 to cause the client application 112 to execute the property fingerprinting system 114 of the client application 112. The property fingerprinting system 114 may comprise executing logic to request the client application 112 to produce (e.g., return) application property values corresponding to application window properties, screen properties, and browser properties associated with the client application 112. The client application 112 may in turn execute logic to retrieve properties from the operating system of the client device 110. When the client application 112 is a malicious application, the client application 112 may be altered or otherwise configured to overwrite the calls to the operating system and may instead provide pre-determined property values that may not be associated with the client application 112 as a response to the request. The one or more retrieved property values are used to generate the fingerprint response 216. The content server 120 may compare the fingerprint response 216 to expected values, which may be stored in the fingerprint database 126. Based on comparing the fingerprint response 216 to expected values, the content server 120 can determine whether the client application 112 has an expected fingerprint response, which may indicate if the client application 112 is a malicious application.

At step 402, the property fingerprinting system 114 retrieves one or more application property values by executing code received from the content server 120 in the fingerprint request 214. The fingerprint requests 214 may cause the client application 112 to execute code to retrieve property values by interfacing with a client application API 116. In some embodiments, the application property values may correspond to window properties, such as windows name, window location, window size, viewport size, and other windows properties. In some embodiments, application property values may correspond to browser properties, such as browser name, version number, build identifier, application vendor, and other browser properties. In some embodiments, the application property values may correspond to screen properties, such as screen dimensions, color depth, pixel depth, and other screen properties. The property values may be retrieved individually, or the client application 112 may provide functionality to allow all the property values to be retrieved. For example, the property fingerprinting system 114 may use functionality provided by the client application API 116 to retrieve all of the window properties as an array of name-value pairs. The client application API 116 may include the JavaScript API, Java API, or similar interfaces supported by the client application 112. In some embodiments, the property fingerprinting system 114 may be implemented by taking the browser object, window object, or screen object implemented by the client application API 116 and iterate through the object properties to retrieve them in the order that they are stored by the object. In some embodiments, the property fingerprinting object collects one or more of the number of properties, the property name, the property value, and the order the properties are returned by the client application API 116. The client application 112 or the client application API 116 may make use of functionality provided by an operating system API 118 to retrieve application properties from the operating system.

For example, the content server 120 may send the fingerprint request 214 containing JavaScript code to the web browser implementing the property fingerprinting system 114. The web browser may execute the property fingerprinting system 114, which may cause the client application to retrieve a subset of browser property values using functions provided by the JavaScript API to iterate through the browser object and retrieve each property in the order they are stored within the object. The browser property values may be associated with property names such as "appName", "appVersion", "platform", "userAgent", and "vendor", which may be configured to contain the values for the browser name, browser version number, operating system platform, the user-agent header value, and the browser vendor respectively. Some properties, such as the operating system platform, may be retrieved by the JavaScript API using functionality provided by the operating system API, such as a Windows system call.

At step 404, the retrieved properties are used to construct the fingerprint response 216. The fingerprint response 216 comprises information that may be used to create a property fingerprint that can be used to determine whether the client application is likely a legitimate client application. In some embodiments, the property fingerprint may comprise the name-value pairs in the order they were retrieved for a subset of the properties retrieved by the property fingerprinting system 114. In another embodiment, property fingerprint may comprise the name of the property in the order they were retrieved by the property fingerprinting system 114. In another embodiment, the property fingerprint may comprise a single value representing one or more property names and the order in which they were retrieved by the property fingerprinting system 114. In another embodiment, the property fingerprint may be comprised of a hash, such as a MD5 or SHA hash, comprising one or more of the property name, the property value, and the order in which they were retrieved. In some embodiments, the fingerprint response may be based on a subset of application properties, window properties, and screen properties. The property fingerprinting system 114 may use a predetermined subset of screen properties to create the fingerprint response 216. In some embodiments, a hash based solely on the property names and the order of return for the predetermined subset of screen properties may be generated used in the fingerprint response 216. In some embodiments, one or more of the properties retrieved by the property fingerprinting system 114 are not supported by the client application 112, which may cause the fingerprint response 216 to be generated from fewer application properties Continuing the example above, the retrieved subset of browser properties is used to create the fingerprint response 216. The property fingerprinting system 114 may create a value representing the subset of browser properties by merging the retrieved property names, creating a combined value such as "appName appVersion platform userAgent vendor" that represents the property names in the order in which they were retrieved from the browser application. The property fingerprinting system 114 may execute JavaScript code that applies a MD5 hashing algorithm to the combined value to produce a hash for use as the property fingerprint in the fingerprint response 216.

At step 406, the fingerprint response 216 is transmitted to the content server 120. The property fingerprinting system 114 may cause the client application 112 to transmit the fingerprint response 216 to the content server 120. In some embodiments, the fingerprint response 216 may be further obfuscated so as to conceal the property fingerprint as being based on the properties retrieved by the property fingerprinting system 114. The obfuscation may include encrypting the fingerprint response 216 or sending the fingerprint response 216 as part of other traffic sent to the content server 120 as part of handling the content request 212. In some embodiments, in response to the content request 212, the server application 122 may send additional logic to the client application 112 to retrieve the values of one or more properties needed to format the requested content. The property fingerprinting system 114 may send the fingerprint response 216 as part of the response the client application 112 sends to the server application 122 to provide the values of the one or more retrieved property values.

Continuing the example above, in response to the client application 112 sending the content request 212, the server application 122 may request additional properties needed to display the requested content, such as the window size of the browser window and whether the client device 110 is a mobile device. The server application may send JavaScript code to retrieve the additional properties, and the property fingerprinting system may append the fingerprint response to additional properties requested by the server application 122.

In some embodiments, the fingerprint database 126 may contain information representing an association between an identifier for the client application 110 and the expected, or model, property fingerprint. In addition, different version of the client application 110 may behave differently, and the fingerprint database 126 may further include an association of a version identifier for the client application. In some embodiments, the fingerprint database 126 may contain a property fingerprint associated to each version of the client application 110. The model property fingerprint may be generated for each version of a client application 110 by using said version of the client application 110 to execute the same logic used to generate the property fingerprint as part of a fingerprint response 216.

In some embodiments, the subset of application properties used to generate the property fingerprint may be selected based on a determination that a legitimate client application returns the subset of application properties in the same order each time the logic to create a property fingerprint is executed. This order may be consistent or different with different versions of the client application. The subset of application properties used to generate the property fingerprint may be selected based on a determination that a malicious application modifies one or more of the selected application property values. The subset of application properties used to generate the property fingerprint may be selected may be further be based on a determination that when a malicious application modifies one or more of the selected application property values, the property fingerprint system 114 returns the subset of application properties in a different order than prior to or without the modification. In some embodiments, the subset of application properties used to generate the property fingerprint may be based on determining the one or more application properties that are most often modified by a malicious application. The subset of application properties may be further based on determining the one or more application properties that cause a consistent change in the digital fingerprint modified, and that the consistent change is sufficient to identify a malicious application. A consistent change between the property fingerprint of a legitimate client application and malicious software may be based on the property fingerprint of a malicious application not matching any version of any legitimate client for which model property fingerprints are stored. In some embodiments, a subset of the modified application properties is sufficient for selecting the subset of properties used to generate a property fingerprint. In some embodiments, a plurality of malicious applications may be analyzed to determine the properties values that are modified by any of the plurality of malicious applications. The subset of property values may be further based on determining that the property fingerprint for each of the plurality of malicious applications is different from any version of any legitimate client application.

For example, a client application may a web browser. A malicious application may modify certain browser properties, such as the width and height of the screen, in order to pose as a legitimate browser. In selecting the subset of properties to use for the property fingerprint, it may be determined that, by retrieving all of the properties associated with the Screen object in Javascript running on the browser, the order of the properties change. The modified properties may appear at the end of the enumerated list of properties, or the order altered in some other way. A subset of Screen properties can therefore be selected by using properties which, combined with the width and height properties, would create a subset of properties that consistently change in order when retrieved by the property fingerprint system. A number of properties may be selected that the order is different in the malicious application when compared to any version of any legitimate browser for which a digital fingerprint is stored in the fingerprint database.

Figure 5:
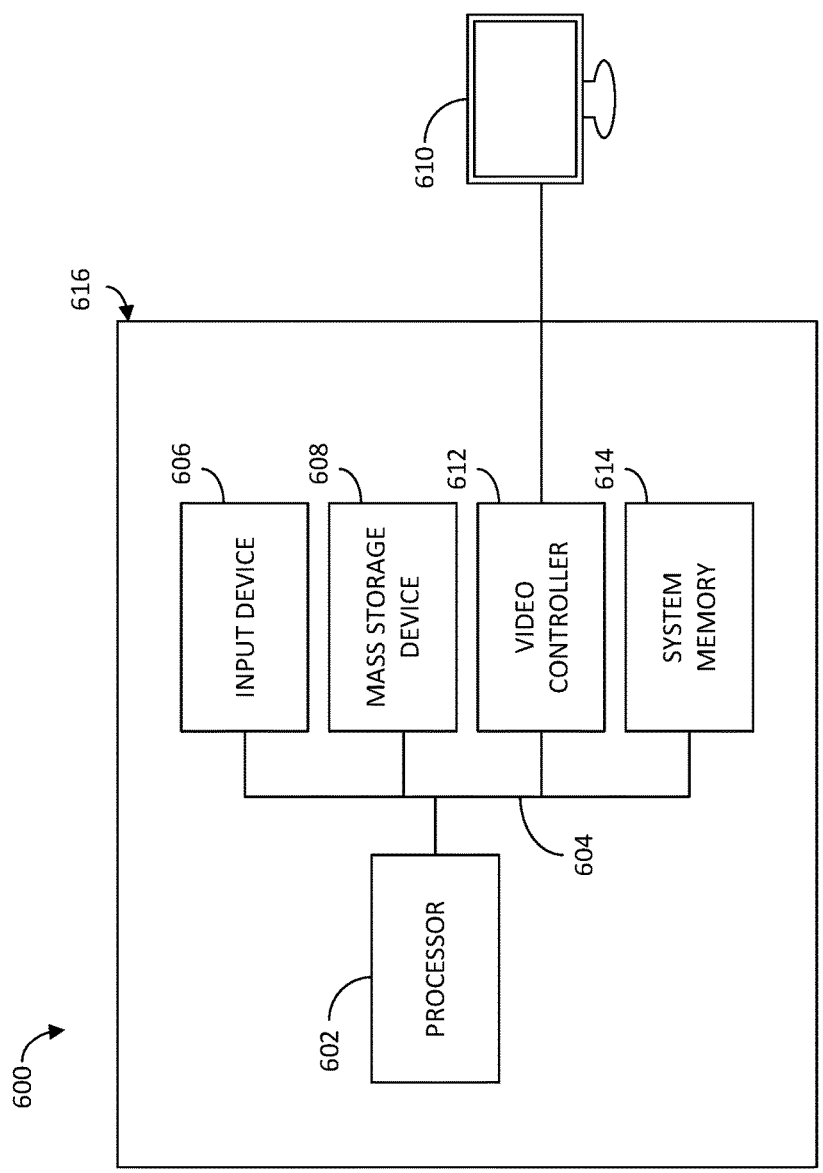
FIG. 5 is a block diagram of a system for implementing a device according to an embodiment of the present disclosure.

FIG. 5 is a block diagram of a computer system 500 suitable for implementing one or more embodiments of the present disclosure, including the client device 110 and the content server 120. In various implementations, the client device 110 may include a mobile cellular phone, personal computer (PC), laptop, wearable computing device, etc. adapted for wireless communication, and the content server 130 may include a network computing device, such as a server. Thus, it should be appreciated that the devices 110 and 120 may be implemented as the computer system 500 in a manner as follows.

The computer system 500 includes a processor 502, which is connected to a bus 504. Bus 504 serves as a connection between processor 502 and other components of computer system 500. An input device 506 is coupled to processor 502 to provide input to processor 502. Examples of input devices may include keyboards, touchscreens, pointing devices such as mousses, trackballs, and trackpads, and/or a variety of other input devices known in the art. Programs and data are stored on a mass storage device 508, which is coupled to processor 502. Examples of mass storage devices may include hard discs, optical disks, magneto-optical discs, solid-state storage devices, and/or a variety of other mass storage devices known in the art. computer system 500 further includes a display 510, which is coupled to processor 502 by a video controller 512. A system memory 514 is coupled to processor 502 to provide the processor with fast storage to facilitate execution of computer programs by processor 502. Examples of system memory may include random access memory (RAM) devices such as dynamic RAM (DRAM), synchronous DRAM (SDRAM), solid state memory devices, and/or a variety of other memory devices known in the art. In an embodiment, a chassis 516 houses some or all of the components of computer system 500. It should be understood that other buses and intermediate circuits can be deployed between the components described above and processor 502 to facilitate interconnection between the components and the processor 502.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:
a non-transitory memory; and
one or more hardware processors coupled with the non-transitory memory and configured to execute instructions from the non-transitory memory to cause the system to perform operations comprising:
requesting a plurality of application properties from a client application operable to view web pages on a client device over a network, the plurality of application properties comprising a window name, a window location, a window size, a view port size, or a pixel depth;
receiving a digital fingerprint from the client device based on an order that the plurality of application properties is returned by the client application;
determining, at least in part by comparing a first order associated with the digital fingerprint to a second order associated with one or more stored digital fingerprints, whether the digital fingerprint indicates that the plurality of application properties do not appear in an expected order wherein the determining further comprises determining whether a predetermined one of the application properties appears at an end of a list of the plurality of application properties returned by the client application; and taking a mitigation action based on a determination that the plurality of application properties do not appear in the expected order.

2. The system of claim 1, wherein the plurality of application properties further comprises browser properties that include a browser name, a browser version number, a browser build identifier, or a browser application vendor.

3. The system of claim 1, wherein each application property of the plurality of application properties comprises an application property identifier and an application property value, and wherein the digital fingerprint comprises a hash based on an ordering of the application property identifiers.

4. The system of claim 1, wherein the requesting of the plurality of application properties is performed via script code embedded in a web page that is transmitted to the client device.

5. The system of claim 1, wherein one or more of the application properties is based on one or more device properties of the client device.

6. The system of claim 1, wherein the taking the mitigation action comprises prohibiting a transaction, requiring a secondary authentication, or instituting one or more restrictions or limits on the client device and/or a user account associated with the client application.

7. The system of claim 1, wherein the requesting the plurality of application properties is performed via an Application Programming Interface (API) call.

8. A method comprising:

requesting a plurality of application properties from a client application operable to view web pages on a client device over a network, the plurality of application properties comprising window properties or screen properties, the windows properties or screen properties comprising a window name, a window location, a window size, or a view port size;

receiving the plurality of application properties from the client application;

generating a digital fingerprint based on an order that the plurality of application properties is returned by the client application;

determining whether the digital fingerprint matches a stored digital fingerprint based on an expected order that the plurality of application properties should be returned by the client application, including determining whether a specified one of the application properties appears at a predefined location of a list of the plurality of application properties returned by the client application; and taking a mitigation action based on determining that the digital fingerprint does not match the stored digital fingerprint.

9. The method of claim 8, wherein determining whether the digital fingerprint matches the stored digital fingerprint is further based on a quantity of application properties in the plurality of application properties.

10. The method of claim 8, further comprising determining the stored digital fingerprint based on a client application type of the client application.

11. The method of claim 10, further comprising determining the client application type based on one or more application properties in the plurality of application properties, wherein at least one application property in the plurality of application properties comprises the client application type.

12. The method of claim 8, wherein each application property of the plurality of application properties comprises an application property identifier and an application property value, and wherein the digital fingerprint comprises a hash based on an ordering of the application property identifiers.

13. The method of claim 8, wherein the requesting of the plurality of application properties is performed via script code embedded in a web page that is transmitted to the client device.

14. The method of claim 8, wherein the predefined location is at an end of the list.

15. A non-transitory machine-readable medium having stored thereon machine-readable instructions executable to cause a machine to perform operations comprising:

requesting a plurality of application properties from a client application operable to view web pages on a client device over a network, the plurality of application properties comprising a window name, a window location, a window size, or a view port size;

receiving a client application type based on one or more application properties of the plurality of application properties;

receiving a digital fingerprint from the client device based on an order that the plurality of application properties is returned by the client application;

determining an expected order of application properties of the plurality of application properties based on the client application type;

comparing a first order associated with the digital fingerprint to a second order associated with one or more stored digital fingerprints;

determining, based at least in part on the comparing, that the digital fingerprint indicates that a predetermined one of the application properties appears at a specified portion of a list of the plurality of application properties returned by the client application; and taking a mitigation action based on determining that the predetermined one of the application properties appears at the specified portion of the list of the plurality of application properties returned by the client application.

16. The non-transitory machine-readable medium of claim 15, wherein the plurality of application properties further comprises browser properties that include a browser name, a browser version number, a browser build identifier, or a browser application vendor.

17. The non-transitory machine-readable medium of claim 15, wherein each application property comprises an application property identifier and an application property value, and wherein the digital fingerprint comprises a hash based on an ordering of the application property identifiers.

18. The non-transitory machine-readable medium of claim 17, wherein the specified portion is at an end of the list of the plurality of application properties returned by the client application.

19. The non-transitory machine-readable medium of claim 15, wherein the requesting of the plurality of application properties is performed via script code embedded in a web page that is transmitted to the client device.

20. The non-transitory machine-readable medium of claim 15, wherein one or more of the application properties is based on one or more device properties of the client device.

\* \* \* \* \*